April 4, 1944.                J. E. WHITFIELD                2,345,780
                              REVERSING VALVE
                          Filed Jan. 18, 1943            4 Sheets-Sheet 1
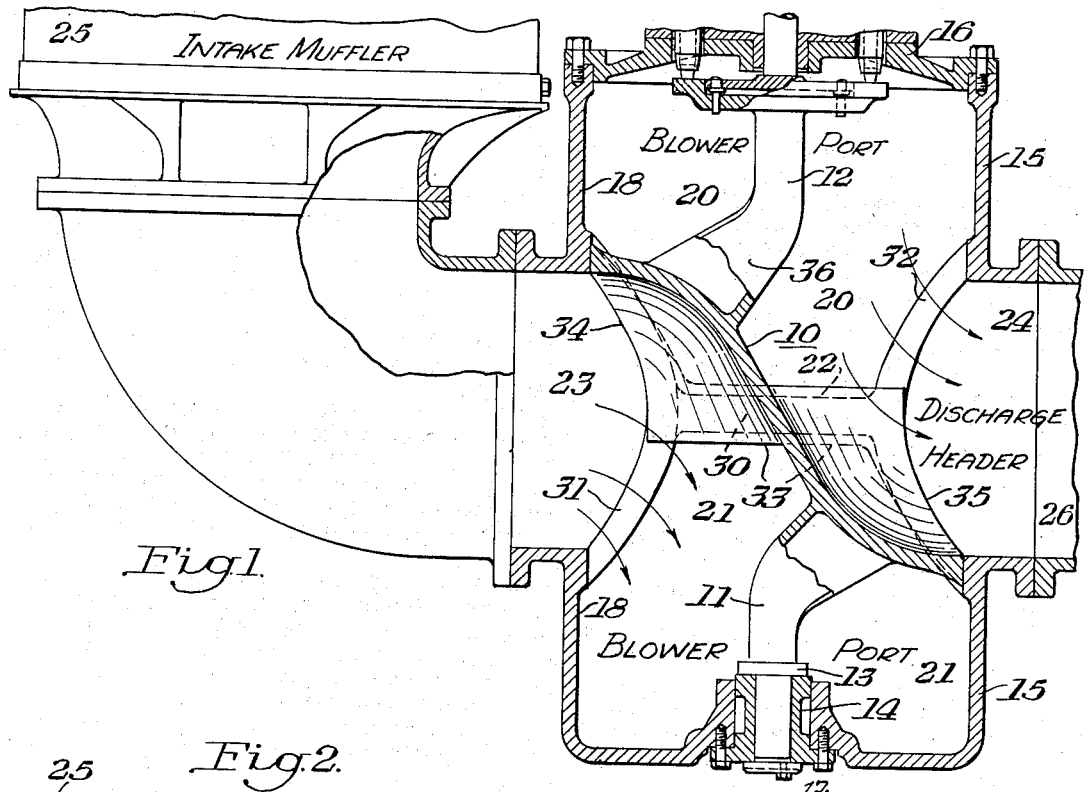
Fig 1.
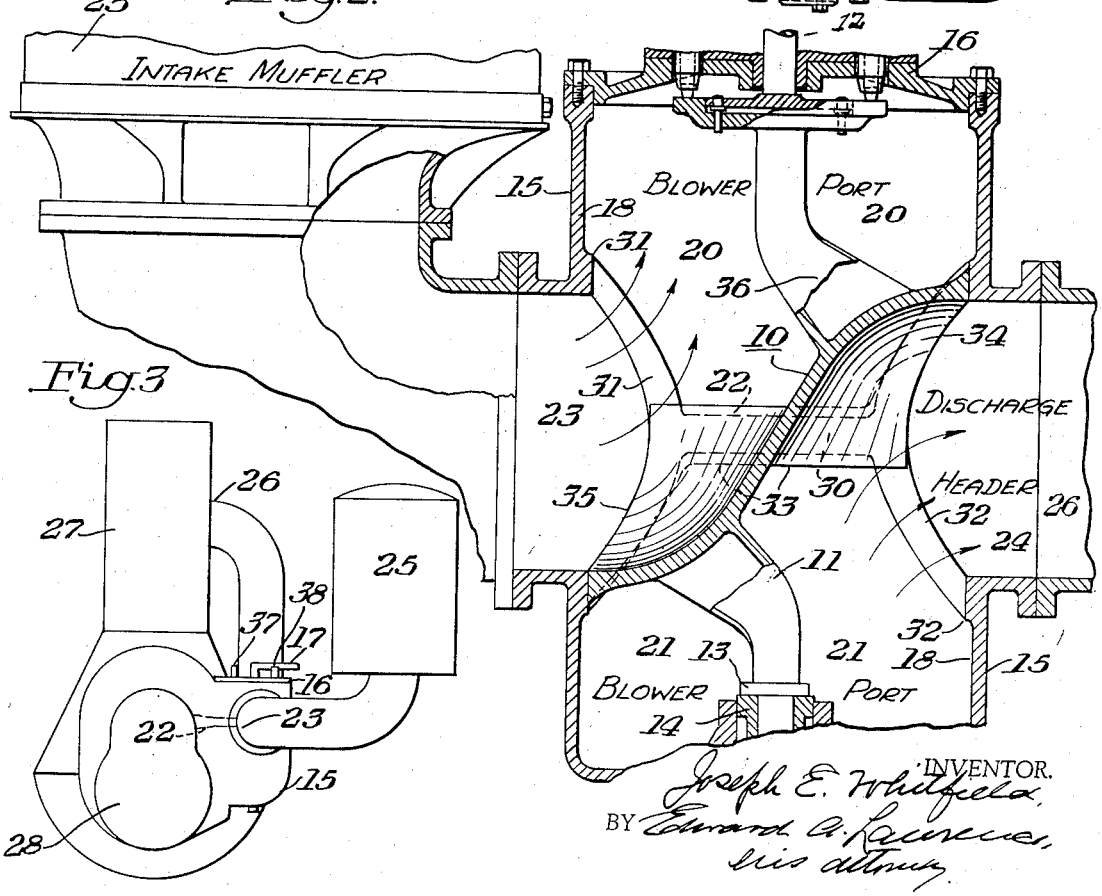
Fig. 2.
Fig. 3.
INVENTOR.
Joseph E. Whitfield,
BY Edward A. Lawrence,
his attorney.

April 4, 1944.   J. E. WHITFIELD   2,345,780
REVERSING VALVE
Filed Jan. 18, 1943   4 Sheets-Sheet 2

INVENTOR.
Joseph E. Whitfield
BY Edward N. Lawrence
his attorney

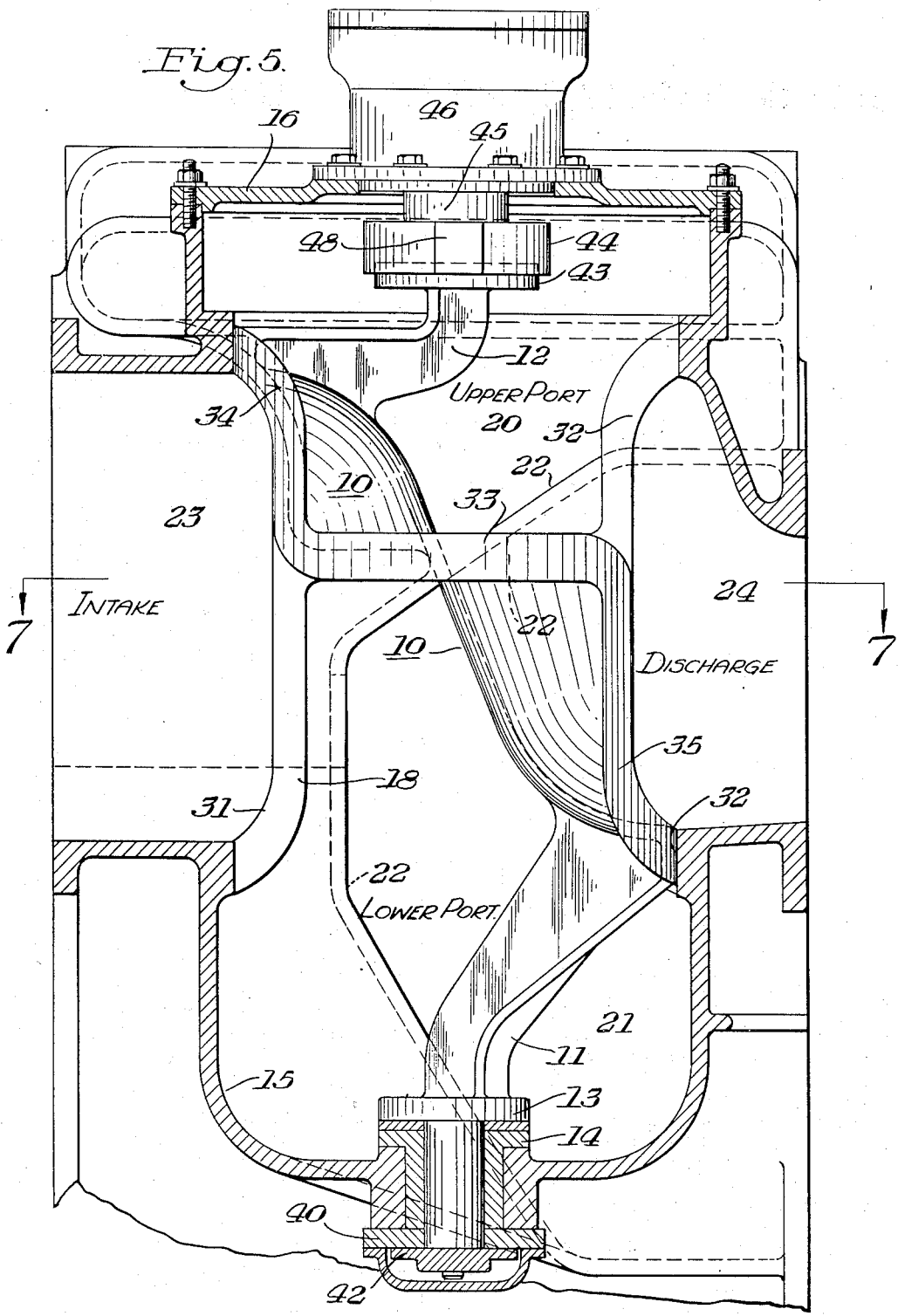

April 4, 1944.  J. E. WHITFIELD  2,345,780
REVERSING VALVE
Filed Jan. 18, 1943  4 Sheets-Sheet 4
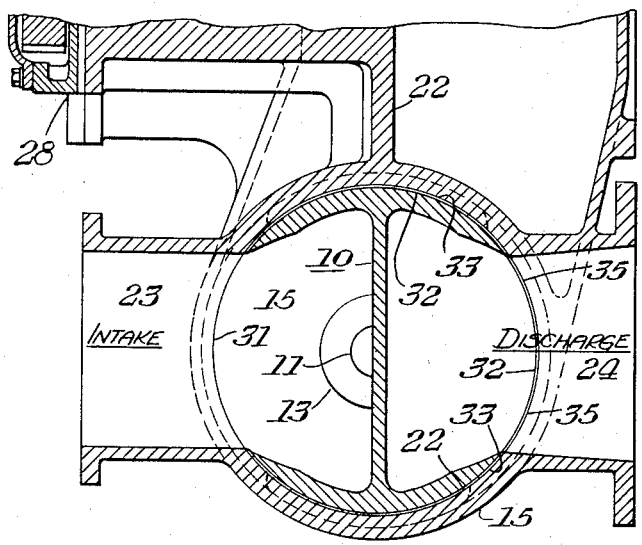
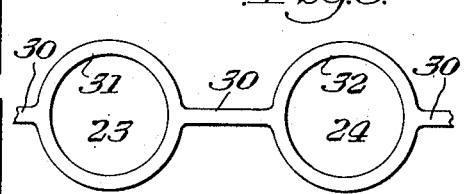
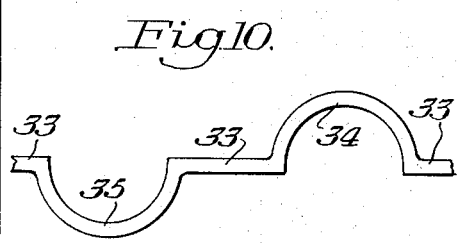
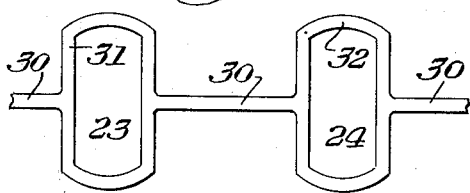
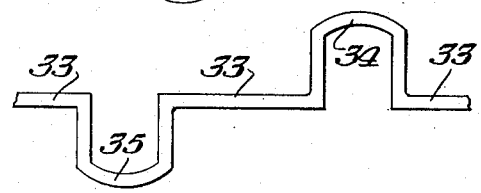
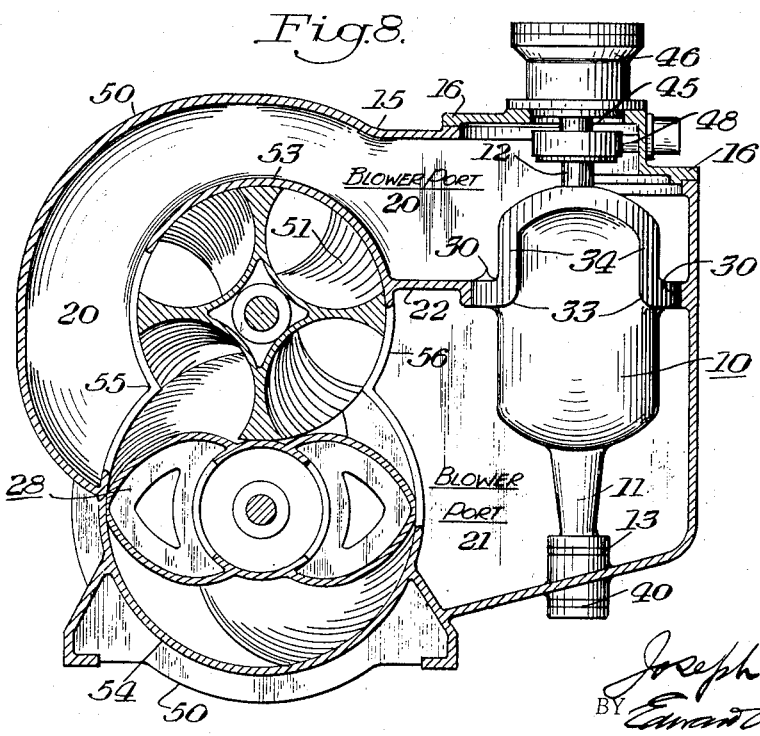
INVENTOR.
Joseph E. Whitfield
BY Edward A. Lawrence
his attorney.

Patented Apr. 4, 1944

2,345,780

UNITED STATES PATENT OFFICE 2,345,780

REVERSING VALVE

Joseph E. Whitfield, Hamilton, Ohio

Application January 18, 1943, Serial No. 472,659

6 Claims. (Cl. 251—108)

This invention relates generally to reversing valves and more particularly to reversing valves for changing the direction of flow of scavenging or supercharging air produced by a screw blower driven directly from the shaft of a reversible marine Diesel engine.

The screw blower is shown and described in Letters Patent No. 2,287,716 and is made up of a rotor member and a gate member disposed in parallelism and having complementary intermeshing helical threads, the curved sides of the rotor threads being described by the continuous edges of the helical threads of the gate, and the curved troughs of the gate being described by the continuous edges of the crests of the helical threads of the rotor. This is an axial flow blower that produces the same flow characteristics when rotated in either direction and is effective in producing the air flow required commensurate with the speed of the engine. The valve for switching the port connection must be reversed after sufficient air has been supplied to scavenge the cylinders before the engine stops and before it is started in the reverse direction. It is therefore necessary to actuate the reversing valve in timed relation with the reversal of the engine.

The principal object of this invention is the provision of a reversing valve for changing the direction of the flow of scavenging air from a screw blower to a reversible internal combustion engine.

Another object is the provision of an air flow reversing valve that has a low resistance to the passage of air therethrough.

Another object is the provision of a unitary reversing valve made in one piece and having relatively small space requirements.

Another object is the provision of a reversing valve that is simple in construction and economical to manufacture.

Another object is the provision of a reversing valve having a continuous cylindrical sealing line the intermediate portion of which is circular and the remote ends follow the curve formed by the intersection of two intersecting cylinders with their axes disposed normal to one another.

Another object is the provision of a reversing valve having a continuous sealing line inscribed in a cylindrical surface with opposite intermediate portions in the same transverse plane which are connected at their adjacent ends by oppositely disposed concave arcuate portions.

Another object is the provision of a reversing valve having a symmetrically balanced continuous sealing line inscribed in a cylindrical surface following the intersection of two parallel planes connected by an intermediate plane radial to the cylindrical surface.

Another object is the provision of a reversing valve member having oppositely extending gudgeons the outer ends of which are axially aligned for rotatably carrying the valve.

Other objects and advantages appear in the following description and claims.

In the accompanying drawings a practical embodiment illustrating the principles of this invention is shown wherein:

Fig. 1 is a vertical sectional view of the reversing valve case and valve member comprising this invention.

Fig. 2 is a view similar to Fig. 1 showing the valve member in its reversed position.

Fig. 3 is a schematic view of an internal combustion engine with the blower and reversing valve mounted thereon.

Fig. 5 is a sectional view taken on the line 5—5 of Fig. 4.

Fig. 7 is a sectional view taken on the line 7—7 of Fig. 5.

Fig. 8 is a sectional view showing the valve as in Fig. 4 together with rotor members of a screw blower.

Fig. 9 is a schematic view of the sealing surfaces of the valve case shown in Figs. 1 and 2.

Fig. 10 is a schematic view of the sealing surface of the valve shown in Figs. 1 and 2.

Fig. 11 is a schematic view of the sealing surfaces of the valve case shown in Figs. 4 and 5.

Fig. 12 is a schematic view of the sealing surface of the valve shown in Figs. 4 and 5.

Figure 4:
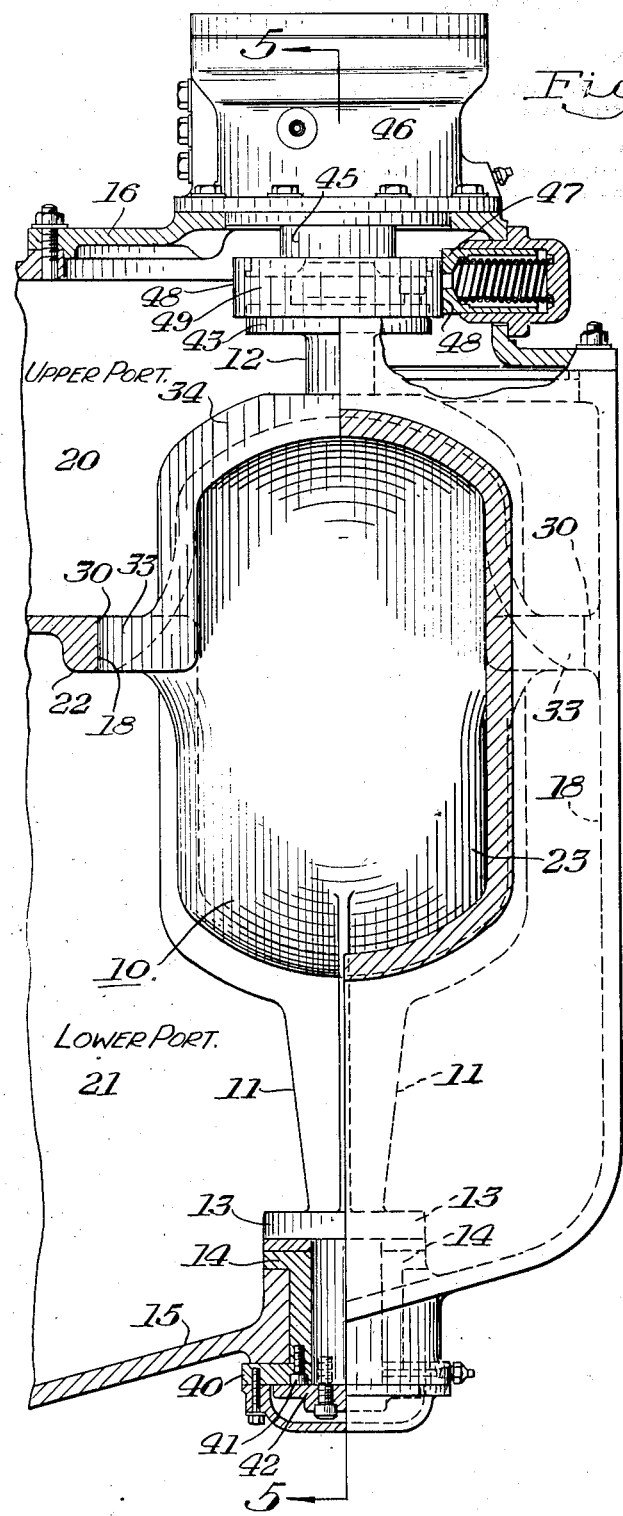
Fig. 4 is a partial sectional view of the valve and casing when observed from the intake port.

Referring to the drawings, 10 represents the valve member made up of oppositely disposed hoods which are preferably cast in one single piece having oppositely extending gudgeons 11 and 12, the outer ends of which are axially aligned for rotatably supporting the valve member. The lower gudgeon 11 is provided with a radial shoulder 13 that engages the end of the bearing 14 and forms the rotary part of a collar thrust bearing. The bearing 14 has a radial flange at the lower end thereof which is arranged to be bolted to the seat produced by the enlarged bore in the under face that closes the bottom of the valve casing 15. A cap plate is bolted to the underside of the bearing flange for enclosing the gudgeon in the bore.

The upper gudgeon 12 is journaled in a bearing formed in the circular plate 16 that closes the upper end of the valve casing 15. The gudgeon 12 extends through the closure plate 16 and is arranged to be connected to a suitable servo motor for actuating the valve member. In Fig. 3 a hand lever 17 has been provided in place of the servo motor, for the purpose of illustrating means for rotating the valve. The upper end of the gudgeon 12 is provided with a coupling to facilitate the assembly of the valve to the servo motor.

The valve casing 15 has a cylindrical bore or valve chamber 18 the rear side of which opens directly into an upper and lower blower port 20 and 21 divided by the horizontal central partition 22. The valve chamber 18 thus forms an aperture in the transverse partition wall 22. The front of the valve casing 15, which is removed in Figs. 1 and 2, is cylindrical as indicated in Fig. 3.

Aligned lateral ports 23 and 24 are formed in the sides of the valve casing 15 and are connected by passageways to the intake muffler 25 and the discharge header 26 respectively. The ports 23 and 24 are circular in cross section and they intersect and interrupt the cylindrical bore or aperture 18 of the valve casing with their axes normal to the axis of the latter.

The internal combustion engine 27 shown in Fig. 3 has the axial flow screw blower 28 mounted on the end thereof. The rotor member of the screw blower is larger in diameter than the gate member and is directly connected to the engine. The overall diameters of the rotor and gate respectively are similar to the outline of the blower casing as shown. A set of timing gears connect the shafts of the rotor and gate members to keep them rotating in timed relation and thus avoid the necessity of driving the gate by the intermeshing threads of the members. The horizontal partition wall 22 which divides the upper and lower blower ports 20 and 21 is shown in Fig. 3. The port 20 is connected to the passageway that extends up around to the left side of the blower adjacent the rear thereof, while the port 21 is connected to the passageway leading to the right side of the blower adjacent the front thereof. Since this blower is designed to have the same flow characteristics in either direction the front and rear ports connected to the blower chamber should be equivalent in shape and size.

In the valve chamber or aperture 18 the horizontal partition wall 22 and a corresponding portion of the opposite cylindrical wall are raised from the bore as indicated at 30. These arcuate surfaces provide the horizontal sections of the valve sealing line. The rest of the valve sealing line is formed by the raised portions 31 and 32 which follow the curves produced by the intersection of the cylindrical ports 23 and 24, respectively, with the cylindrical valve chamber 18 and which encircle said ports. Thus the raised surfaces 30, 31 and 32 which are joined together form a continuous sealing line lying in an inner cylindrical surface concentrically disposed within the valve chamber.

The valve member 10 has a lateral sealing surface 33 which corresponds to the horizontal sealing surfaces 30 and the arched or outer edges of the hoods correspond to one-half of the port sealing surfaces as indicated at 34 and 35. These surfaces are integrally joined together, thus forming a continuous sealing surface for the full circumference of the valve member 10.

When the valve is positioned as shown in Fig. 1 its arcuate sealing surface 34 mates with the upper half of the valve chamber sealing surface 31 that encircles the port 23, and its arcuate sealing surface 35 mates with the lower half of the valve chamber sealing surface 32 that encircles the port 24. When the valve member 10 is rotated through 180° its arcuate sealing surface 35 mates with the lower half of the valve chamber sealing surface 31 that encircles the port 23, and its arcuate sealing surface 34 mates with the upper half of the valve chamber sealing surface 32 that encircles the port 24 as shown in Fig. 2. In either position the horizontal sealing surfaces 33 on each side of the valve member mate with the corresponding sealing surfaces 30 in the valve chamber.

If the valve member were constructed by using three flat plates corresponding to the three transverse planes passing through the sealing lines 34, 30 and 35, like the risers and tread of a step, the port openings would be greatly restricted. Again if a single flat web were used which extended diagonally from tip to tip of the valve, the port openings would still be partially restricted. To avoid these disadvantages the face of the web of the valve member adjacent the ports is formed concave in the shape of a hood or bonnet, thereby providing an unrestricted fluid passage. The back of the concave surface is convex and provides a materially strengthened structure for securing the gudgeons 11 and 12 thereto. When the gudgeons join the convex hood portion of the web they are flattened as indicated at 36 and shaped into an air flow surface. The gudgeons could be changed to a shaft but the latter structure would not be as mechanically strong as the former.

A suitable stop such as that indicated by the posts 37 and 38 may be provided with the valve operating means for aligning the mating sealing surface in the two positions 180° apart.

Figure 6:
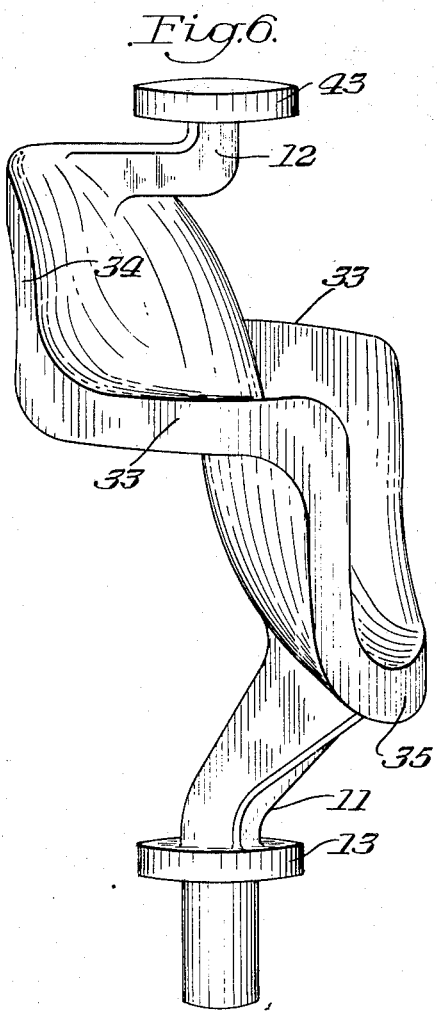
Fig. 6 is a perspective view of the valve member.

A modified form of the valve and casing is shown in Figs. 4, 5 and 7 and the valve member alone is shown in the perspective view of Fig. 6. In Figs. 4, 5 and 7 the valve casing 15 is also formed integral with the screw blower housing and the gudgeons 11 and 12 which rotatably support the valve in the casing are altered somewhat in their shape. The thrust bearing 13 at the lower end of the gudgeon 11 is proportionately larger to support the heavy load due to the pneumatic pressure on the valve when positioned as shown. The complementary bearing 14 is provided with an upper flange the top of which forms the counterpart of the thrust bearing 13 and the under side rests on the boss formed in the casting. A ring 40 is secured to the lower end of the bearing 14 by the bolts 41 and is arranged to engage the under side of the boss in the casting 15 to hold the bearing in place. A plate 42 covering the ring 40 is bolted to the bottom of the gudgeon 11 to enclose the bearing and hold the valve in its proper position when the pneumatic pressure is directed against the under side of the valve tending to lift it.

The upper gudgeon 12 has a radially disposed flange 43 formed integral therewith which fits into a downwardly open socket in the disk 44 that is secured to the lower end of the servo motor shaft 45. The structure of the servo motor 46 forms the subject matter of a co-pending disclosure. However the bearing of the servo motor shaft serves as the upper valve bearing for the gudgeon 12. A friction plunger 47 bears against flattened sections 48 on the edge of the disk 44 and thus braces the valve against a pulsating pneumatic pressure that tends to vibrate the valve.

The partition 22 is disposed horizontally in the vicinity of the valve member as shown in Figs. 4 and 5 to carry the horizontal sealing surfaces 30 of the valve casing. As the partition 22 extends toward the blower unit it divides the valve casing diagonally to direct the upper blower port 20 to the left in Fig. 5 and the lower blower port 21 to the right. The passageway leading from the upper port 20 extends to the opposite side of the rotor members and to the front while the passageway leading from the lower blower port 21 goes to the near side of the rotor members and to the rear.

It will be noted that the horizontal or lateral sealing surfaces 30 are somewhat longer in Fig. 5 than that shown in Figs. 1 and 2 due to the shape of the inlet and outlet ports 23 and 24. These ports are defined by the valve casing sealing surfaces 31 and 32 which in Figs. 1 and 2 are constructed by the intersection of two cylindrical surfaces the axes of which are normal to each other. In Figs. 4 and 5 the ports 23 and 24 are oblong in shape with straight sides and curved ends and defined by the sealing surfaces 31 and 32 having the same shape and lying in a common cylindrical plane. This oblong port provides a particular advantage in the air flow characteristics of the valve and is an important object of this invention.

If a piece of paper was mounted on a platen and rolled around against the continuous sealing surfaces 30, 31 and 32 in the valve casing to obtain an impression thereof and then flattened out, these sealing surfaces would appear as shown in Figs. 9 and 11. The valve sealing surfaces of Fig. 9 are taken from the valve casing shown in Figs. 1 and 2 and the valve sealing surfaces of Fig. 11 are taken from the valve casing shown in Figs. 4 and 5. The schematic views of Figs. 9 and 11 demonstrate how vastly different characters of valve openings may be obtained with relatively small changes in the shape of the hoods or bonnets of the valve member.

The lateral sealing surfaces 33, and the outer arcuate sealing surfaces 34 and 35 of the valve member hoods mate with the corresponding sealing surfaces of the case and also lie in a common cylindrical surface. The upper bonnet or hood section of the valve member carrying the U-shaped sealing surface 34 mates with the upper portion of the sealing surfaces 31 and 32 and the sealing surface 35 of the lower bonnet or hood section mates with the lower portion of the same sealing surfaces. The oblong ports requiring a mating counterpart of the valve member produce an open throat for the free flow of fluid therethrough. The gudgeons have a streamline surface and offer very little resistance. The position of the valve in Figs. 4 and 5 directs the flow from the intake to the lower port 21 where it is directed to the rear end of the blower and is forced from the front end through the port 20 and is thence directed by the valve member to the discharge port 24.

The valve member 10 shown in Fig. 6 clearly illustrates that the sealing surfaces 33, 34 and 35 form one continuous seal around the perimeter of the valve member, which surfaces lie in a common cylindrical surface.

If the continuous sealing surface of the valve members of Figs. 1 and 4 were painted and then rolled over a piece of paper they would leave the impressions indicated in the schematic views of Figs. 10 and 12 respectively which correspond to their mating sealing surfaces of the valve casings as shown in Figs. 9 and 11. If the sealing surfaces 33, 34 and 35 of the valve members were superimposed on their corresponding sealing surfaces 30, 31 and 32 of the valve casing and were moved back and forth to alternately register with the inlet and outlet openings 23 and 24 the action would simulate the movement of the valve in the casing through 180°.

The sectional view shown in Fig. 8 illustrates the relative positions of the valve 10 and the screw blower 28. The screw blower comprises the casing 50 which is formed integral with the valve casing 15 and encloses the upper and lower blower parts 20 and 21 respectively. The upper blower port 20 extends around the top of the gate member 51 to the juncture between the gate member 51 and the rotor member 52. These rotary members operate within cylindrical chambers 53 and 54, respectively, which intersect to form a common blower chamber that permits the gate and rotor members to intermesh with one another. The blower port 20 terminates at the port 55 of the blower chamber and the blower port 21 terminates at the port 56 in the blower chamber. The port 55 extends to and uncovers a part of the front end of the rotary members 51 and 52 and the port 56 extends to and uncovers part of the rear of the rotary members. Timing gears, which are not shown, are employed to maintain the gate and the rotor members in their proper meshed relation and by driving the shaft of the rotor member in either direction pockets are formed between these rotary members and the blower chamber, which pockets convey the air or fluid from one blower chamber port to the other.

Although practical embodiments illustrating the principles of this valve have been shown and described in conjunction with a screw blower which provides scavenging air for Diesel engines it is obviously applicable as a reversing valve for controlling the flow of fluids in other installations.

I claim:

1. A valve comprising a body forming a housing, a transverse partition dividing the housing into inlet and outlet chambers and having an aperture therethrough, a port in each of the opposite walls of the housing which interrupts the edge of the aperture, the surfaces defining the aperture and both ports being joined together and located in a common surface of revolution about an axis normal to the partition, a valve member in the housing supported for rotation about said axis, said valve member having an intermediate base portion the outer arcuate surfaces of which register with the uninterrupted portions of said aperture and oppositely disposed hoods, one hood extending from the upper and the other from the lower side of the base portion, the outer edge of each hood registering with only one-half of its associated port to selectively connect either port to the inlet and outlet chambers when the valve is in operative position.

2. The structure of claim 1 in which the surfaces defining the aperture and both ports are raised from the inner wall of the housing.

3. A valve comprising a body forming a housing, a transverse partition dividing the housing into inlet and outlet chambers and having an aperture therethrough, a port in each of the opposite walls of the housing which interrupt the edge of the aperture, the surfaces defining the aperture and both ports being joined together and located in a common surface of revolution about an axis normal to the partition, a valve member in the housing supported for rotation about said axis, said valve member having oppositely disposed arched hoods on opposite sides of a common transverse plane in which their lateral edges and back walls are integrally joined together, the lateral and outer arcuate edges of each hood registering with the uninterrupted portions of said aperture and one-half of the associated ports respectively to selectively connect either port to the inlet and outlet chambers when the valve is in operative position.

4. The structure of claim 3 characterized in that the outer arcuate edges of the hoods and the corresponding port surfaces are semicircular.

5. The structure of claim 3 characterized in that the outer arcuate edges of the hoods and the corresponding port surfaces are oblong.

6. A rotary valve member of the character disclosed comprising oppositely disposed arched hoods which lie on opposite sides of a common transverse plane in which the lateral edges and back walls of the hoods are integrally joined together, stem means connected to said hoods for rotatably supporting and turning the valve member, the surfaces defining the lateral and outer arched edges of both hoods being continuous and located in a common surface of revolution about the rotary axis of the valve member.

JOSEPH E. WHITFIELD.